United States Patent
Van Buren (10) Patent No.: US 9,900,072 B2
(45) Date of Patent: Feb. 20, 2018

(54) LEO FLEXIBLE SINGLE AXIS BEAMFORMING

(71) Applicant: SEAKR ENGINEERING, INC., Centennial, CO (US)

(72) Inventor: Damon Van Buren, Parker, CO (US)

(73) Assignee: SEAKR ENGINEERING, INC., Centennial, CO (US)

( * ) Notice: Subject to any disclaimer, the term of this patent is extended or adjusted under 35 U.S.C. 154(b) by 124 days.

(21) Appl. No.: 15/178,441

(22) Filed: Jun. 9, 2016

(65) Prior Publication Data

US 2016/0365911 A1 Dec. 15, 2016

Related U.S. Application Data

(60) Provisional application No. 62/173,210, filed on Jun. 9, 2015.

(51) Int. Cl.
| | |
|---|---|
| *H04B 7/06* | (2006.01) |
| *H04B 1/00* | (2006.01) |
| *H04B 7/08* | (2006.01) |
| *H04B 7/185* | (2006.01) |
| *H04B 7/0408* | (2017.01) |

(52) U.S. Cl.
CPC ......... *H04B 7/0617* (2013.01); *H04B 1/0028* (2013.01); *H04B 7/086* (2013.01); *H04B 7/185* (2013.01); *H04B 7/0408* (2013.01)

(58) Field of Classification Search
CPC .. H04B 7/0617; H04B 1/0028; H04B 7/0408; H04B 7/185; H04B 7/086
See application file for complete search history.

(56) References Cited

U.S. PATENT DOCUMENTS

| | | | |
|---|---|---|---|
| 6,559,797 B1 | 5/2003 | Chang | |
| 6,697,643 B1 * | 2/2004 | Hagerman | H04B 7/10 455/13.3 |
| 2009/0103593 A1 * | 4/2009 | Bergamo | H04B 1/707 375/146 |
| 2010/0117903 A1 * | 5/2010 | Zheng | H01Q 3/2605 342/373 |
| 2010/0201566 A1 * | 8/2010 | Wyler | H04B 7/1851 342/354 |
| 2012/0033761 A1 * | 2/2012 | Guo | G01S 3/023 375/316 |
| 2013/0163705 A1 | 6/2013 | Stirland | |

(Continued)

FOREIGN PATENT DOCUMENTS

JP 04954099 B2 6/2012

OTHER PUBLICATIONS

International Search Report, for International Application No. PCT/US2016/036755, dated Sep. 20, 2016.

*Primary Examiner* — Kenneth Lam
(74) *Attorney, Agent, or Firm* — Robert G. Crouch; Marsh Fischmann & Breyfogle LLP (57) ABSTRACT

A hybrid system of satellite-based beamforming that includes digitally beamforming in one axis and physically beamforming in an orthogonal axis. Based on the orientation of the satellite, the digital beamforming axis may be the in-track axis, the cross-track axis, or anywhere in between those two axes. In the digitally beamformed axis, the beam pattern can be steered to different positions along the axis and it can be compressed or expanded, as desired.

20 Claims, 5 Drawing Sheets

(56) References Cited

U.S. PATENT DOCUMENTS

| | | | |
|---|---|---|---|
| 2015/0016240 A1* | 1/2015 | Chang | H04B 7/2041 370/210 |
| 2016/0149599 A1 | 5/2016 | Lindsay et al. | |
| 2017/0033852 A1* | 2/2017 | Kim | H04B 7/0617 |

* cited by examiner

LEO FLEXIBLE SINGLE AXIS BEAMFORMING

CROSS REFERENCE TO RELATED APPLICATIONS

This application claims the benefit of U.S. Provisional Application No. 62/173,210, filed Jun. 9, 2015, which is incorporated herein by reference in its entirety.

BACKGROUND

A Low Earth Orbit (LEO) is a satellite orbit around Earth with an altitude between 160 kilometers (99 mi) (orbital period of about 88 minutes) and approximately 2,000 kilometers (1,200 mi) (orbital period of about 127 minutes). These orbits can be distinguished from a higher-altitude Geostationary Earth Orbit (GEO) in which a satellite remains above a fixed point on the Earth. Several large LEO satellite constellations are currently being developed. Many of these constellations utilize fixed beam patterns to provide spatial division and better link performance to subscriber terminals. The fixed beams are generated either by individual horns, or by the use of Butler matrices to operate the horns as a phased array antenna system.

Systems using fixed beams suffer from similar launch and operation issues. First, due to requirements for non-interference with GEO spacecraft, they must avoid transmitting and receiving directly up/down to ground equipment near the equator. Second, because these constellations must utilize many spacecraft for full coverage, it can take many months/years from launch of the first satellite to completion of the constellation. During this time, systems do not have full coverage, and so cannot begin paid operation, delaying the revenue stream. Third, the density of spacecraft increases in higher or lower latitudes for constellations with near-polar orbits, as the planes of such orbits move closer together near the poles. This results in increased beam overlap, which may result in increased interference since the spacecraft all use the same frequency channels over a particular region. This also means the constellation is less efficient than it could be over these regions.

The first issue (non-interference with GEO spacecraft signals) is solved by either disabling the links near the equator, or tilting the beams (possibly by tilting the spacecraft) in the in-track direction to provide coverage which is not in line with GEO spacecraft. For fixed beams, there is no solution for the second issue. Generation of revenue must wait until enough spacecraft are in orbit. For the third issue, beams may be turned off to conserve power, but the beam placement and coverage will not be ideal as the spacecraft moves through the latitudes. This means a loss of revenue, as the system serves fewer subscribers than it would if the beam pattern were optimized throughout the range of operating latitudes.

What is needed, therefore, are improved techniques for beamforming.

SUMMARY

The disclosure herein is directed to a transmit beamformer that includes a first beamforming unit that receives M different digital signals to each be placed into M beams and a second beamforming unit that receives M different digital signals to each be placed into M beams. Each of the first and second beamforming unit includes a digital beamformer that receives the M different digital signals to each be placed into a beam, and performs digital beamforming on the M different digital signals to create M different beamformed digital signals; M digital-to-analog converters to convert the M different beamformed digital signals to M different beamformed analog signals; M amplifiers to amplify the M different beamformed analog signals; and M antenna elements to transmit the M different amplified beamformed analog signals to form M different beams oriented along an axis in space. The first and second beamforming units that each form M different beams creates an M×2 array of different beams. Each of the M beams is created by digital beamforming, but each beam has an angular extent that is determined by the antenna elements and is not determined by digital beamforming and each of the beams has a position in space that is determined by all three of the angular orientation of the beamformer, the antenna elements, and digital beamforming.

The disclosure herein is directed to a receive beamformer that includes a first beamforming unit that receives M different element signals to each be formed into M beams and a second beamforming unit that receives M different element signals to each be formed into M beams. Each of the first and second beamforming unit includes M antenna elements to receive the M different analog RF element signals to form M different overlapping element beams oriented along an axis in space; M amplifiers to amplify the M element signals; M Analog to Digital Converters (ADCs) to digitize the amplified element signals; and a digital beamformer that receives the M different digitized element signals, and performs digital beamforming on the M different digital element signals to create M different digital beam signals. The first and second beamforming units that each form M different beams create an M×2 array of different beams. Each of the M beams is created by digital beamforming, but each beam has angular extent that is determined by the antenna elements and is not determined by digital beamforming and each of the beams has a position in space that is determined by all three of the angular orientation of the beamformer, the antenna elements, and digital beamforming.

The disclosure herein is directed to a method for forming transmitted beams, including performing the following operations N times on different sets of digital signals: receiving M different digital signals to each be placed into a beam; performing digital beamforming on the M different digital signals to create M different beamformed digital signals; converting the M different beamformed digital signals to M different beamformed analog signals; amplifying the M different beamformed analog signals; and transmitting the M different amplified beamformed analog signals to form M different beams oriented along a first axis in space. An M×N array of different beams is formed thereby wherein the M×N array includes N columns of M beams, and wherein a position of each of the M beams in each column is created by digital beamforming, but each column has a width that is determined by the transmitting operation and is not determined by digital beamforming.

Each column of M beams may have an angular extent. The angular extent may be varied by digital beamforming. The angular extent may be reduced. The angular extent may be increased.

The method may be practiced in a satellite orbiting around the Earth, wherein the direction of orbit of the satellite relative to the Earth is the in-track direction and an orthogonal direction is the cross-track direction, and one or more of the M beams is moved relative to the satellite by digital beamforming to move the position of the one or more of the M beams on the Earth. One or more of the M beams may be moved in the in-track direction by digital beamforming. One or more of the M beams may be moved in the cross-track direction by digital beamforming.

The disclosure herein is directed to a method for forming received beams, including performing the following operations N times on different sets of analog element signals: receiving M different analog element signals; amplifying the M element signals; digitizing the M element signals; and performing digital beamforming on the M different digital element signals to create M different digital beam signals that are oriented along a first axis in space. An M×N array of different beams is formed thereby, wherein the M×N array includes N columns of M beams, and wherein a position of each of the M beams in each column is created by digital beamforming, but each column has a width that is determined by the receiving operation and is not determined by digital beamforming.

Each column of M beams may have an angular extent. The angular extent may be varied by digital beamforming. The angular extent may be reduced. The angular extent may be increased.

The method may be practiced in a satellite orbiting around the Earth, wherein the direction of orbit of the satellite relative to the Earth is the in-track direction and an orthogonal direction is the cross-track direction, wherein one or more of the M beams is moved relative to the satellite by digital beamforming to move the position of the one or more of the M beams on the Earth. One or more of the M beams may be moved in the in-track direction by digital beamforming. One or more of the M beams is moved in the cross-track direction by digital beamforming.

BRIEF DESCRIPTION OF THE DRAWINGS

The disclosure herein is described with reference to the following drawings, wherein like reference numbers denote substantially similar elements.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Disclosed herein are techniques and systems related to beamforming. Beamforming may include combining elements in a phased array antenna system in such a way that signals at particular angles experience constructive interference while others experience destructive interference. Beamforming can be used at both the transmitting and receiving ends in order to achieve spatial selectivity. Beamforming can be performed in the physical realm by the placement and orientation of the antenna elements. It can be achieved in the signal realm (both analog and digital) by controlling the relative phase of the signals sent to each antenna element.

All of the previously-mentioned issues may be solved by the use of digital beamforming, which would allow the flexible adjustment of beams to optimum locations for each stage of the mission and through the orbit. However, full digital beamforming (digital beamforming simultaneously in each of the in-track dimension and the cross-track dimension) introduces other significant issues for the transmitting side of the link. Digital beamforming requires high performance processing, and therefore utilizes substantial power. Digital beamforming also combines many carriers for each element signal, resulting in substantial increase in crest factor for the transmitting element signals. This increased crest factor, in turn, leads to the need for increased back-off in the RF power amplifiers used to transmit downlink signals. Increased back-off reduces the power efficiency of the RF power amplifiers, which is a significant power penalty for the spacecraft.

Digital beamforming also increases system complexity, because precise phase and time alignment must be maintained across all of the element signals. This may require use of sophisticated calibration methods to align element signals. Or it may result in the need to precisely control the alignment of the digital beamforming processing pipeline across multiple high speed beamforming devices without calibration. Either of these approaches can significantly increase the overall complexity of the on-board processing system.

Disclosed herein is the combination of digital beamforming in one axis with traditional, physical beamforming in the other axis to overcome the drawbacks of both 1) fixed beams, and 2) full digital beamforming, and to address the three problems of LEO constellation operation outlined above.

Digital beamforming in one axis is combined with physical beamforming in the other axis. The physical/analog beamforming is created by horns, slotted waveguide antennas, or an array of smaller horns combined with a Butler matrix. The digital beamformer and the RF amplifiers only carry the signals for one row or one column of beams, not the full beam matrix. As can be appreciated, physical beamforming is created in the other axis based on the physical characteristics of the antenna element. In other words, the width of the beam in that direction or dimension is a function of the antenna element, and is not created by digital beamforming.

Digital beamforming in only one axis provides the following advantages over full digital beamforming:
  Reduced processing complexity in the digital beamformer, because the digital beamformer now sees a reduced number of channels and elements.
  Lower crest factor on element signals, resulting in reduced amplifier back-off and increased amplifier efficiency.
  Elimination of the need for system-level element calibration, because only a few elements are utilized in the digital beamforming. Generation of element signals is kept to a single FPGA or ASIC.

The hybrid digital/physical/analog beamformer provides the best mix of simplicity, flexibility, and efficiency for LEO satellite constellations. Digital beamforming in only one axis provides the following benefits for LEO:

- Allows the beam pattern to be expanded or contracted in one axis.
- Expansion of the beam pattern allows each spacecraft to widen its coverage, providing full coverage earlier in the launch cycle of the constellation. This enables early turn on of the revenue stream. For example, expansion of the beam pattern by 33% in the in-track direction provides full coverage with only 75% of the spacecraft per orbital plane.
- Contraction of the beam pattern can also provide tighter beam spacing in the cross-track direction. This increases subscriber density, providing increased revenue. The beam pattern can be continuously adjusted to provide optimum coverage as the spacecraft moves through different latitudes.
- Digital beamforming provides graceful degradation in the case of RF amplifier failure. If one amplifier fails, the system can still form all of the beams, albeit with broader beams and lower power per beam.
- Digital beamforming enables increased beam power of any of the beams relative to the others. This provides flexibility to overcome increased atmospheric interference due to adverse weather, without increasing the load on one of the amplifiers relative to the others.
- Use of Butler matrices for the other dimension greatly reduces the size of the antenna array.

One clearly novel aspect of this approach is the combination of digital beamforming on one axis with physical/analog beamforming on the other, for LEO satellite applications, to overcome the specific challenges of LEO constellations.

Figure 1:
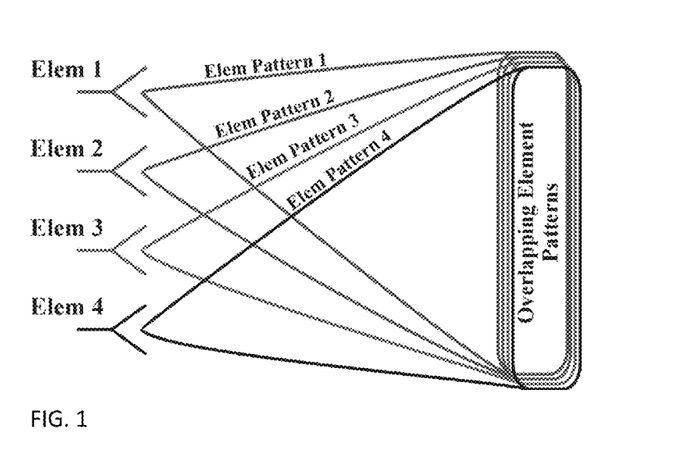
FIG. 1 is a four-element antenna array.

FIG. 1 a four element antenna array, including Element 1, Element 2, Element 3, and Element 4. The four elements provide overlapping element patterns, including Element Pattern 1, Element Pattern 2, Element Pattern 3, and Element Pattern 4. The element patterns may be long enough to allow steering of the digital beams over the full desired range.

Figure 2:
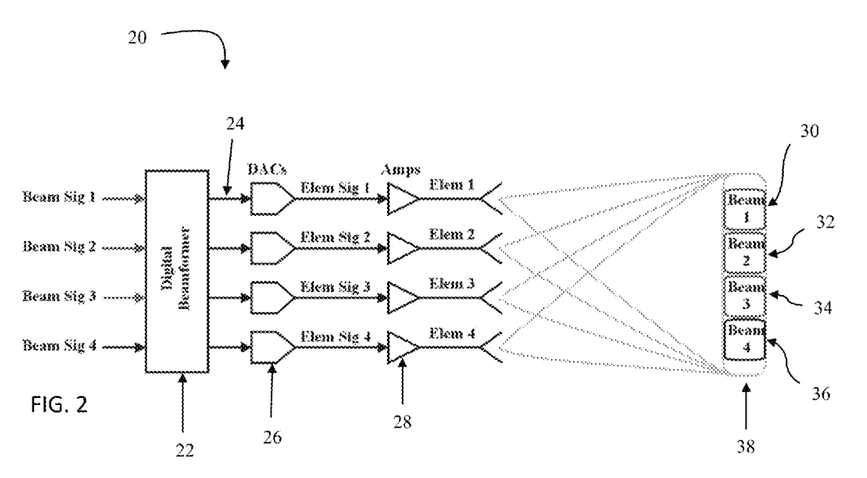
FIG. 2 is a block diagram showing the use of digital beamforming to create four narrow beams within the overlapping element patterns.

FIG. 2 shows a system 20 that includes a Digital Beamformer 22 that receives Beam Signal 1, Beam Signal 2, Beam Signal 3, and Beam Signal 4. For each of the input beam signals, the digital beamformer generates four element signals which are offset in phase and amplitude with respect to the others. The element signals from each beam are then added, so that each element signal includes contributions from all four beams. The Digital Beamformer 22 provides a plurality of outputs 24 that are provided to a bank of DACs 26 that convert the digital signals to analog signals (Element Signal 1, Element Signal 2, Element Signal 3, and Element Signal 4). These analog signals are provided to a bank of Amplifiers 28 that amplify the analog signals. Of course, while not shown here, other conventional RF and IF analog components and signal condition elements items such as RF mix elements, filters, impedance matching networks, other stages, and other RF analog components may also be employed. The amplified signals are provided to Antenna Element 1, Antenna Element 2, Antenna Element 3, and Antenna Element 4. The digital beamformer 22 creates four narrow beams 30, 32, 34, and 36 within the overlapping element patterns. In this case, four digital beams are formed in a column in the in-track direction, by exciting each of four elements with a slightly different phase for each carrier. This produces a column 38 of four beams 30, 32, 34, and 36 within the overlapping element patterns of the antenna array.

As shown in FIGS. 3b-3f, four such columns 38, 40, 42, and 44 are created by utilizing 16 total elements, and 16 digitally generated element signals. It is important to note, however, that because digital beamforming is shown here in the in-track direction only, each digital beamformer only has four channel input signals and four element output signals. This greatly reduces the amount of digital processing required, as well as the cresting of the element signals. It also significantly reduces the burden for calibration and alignment of signals, since only the four element signals in each column need to be aligned, and these four can be contained within a single processing device (ASIC).

Figure 3A:
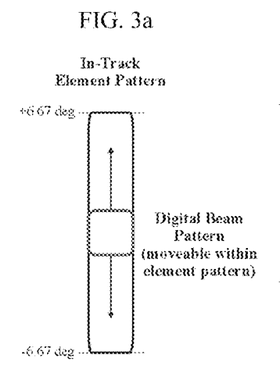
FIGS. 3a, 3b, 3c, 3d, 3e, and 3f show some in-track digital beamforming examples.
Figure 3B:
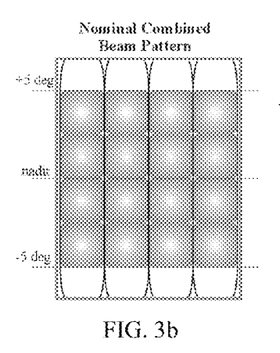

The nominal 4×4 beam pattern is shown in FIG. 3b. The beams occupy ±5 degrees in latitude and ±5 degrees in longitude when the spacecraft is over the equator. The controlled movement of a single beam up and down the column is shown in FIG. 3a.

Figure 3C:
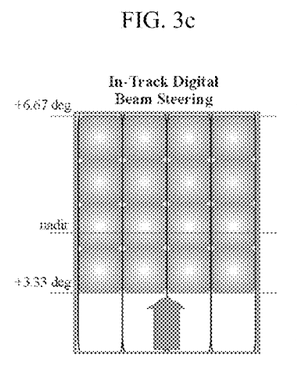
Figure 3D:
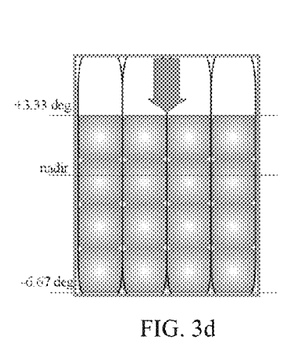

FIGS. 3c and 3d show how the beams may be steered forward or backward in the in-track direction (shown as up and down in the figures) by adjusting the phase of the element signals in the digital beamformer. This feature gives the ability to steer beams into or out of the equatorial region, allowing the LEO systems to meet the requirement for GEO non-interference over a larger portion of their orbit.

Figure 3E:
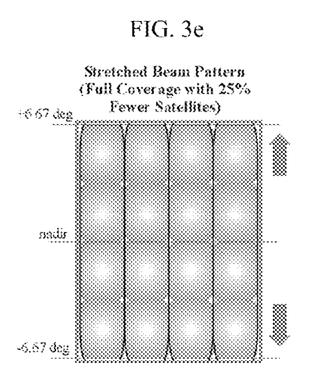

FIG. 3e shows the stretching or spreading of the beam pattern in the in-track direction. In this case, the beams are spread to occupy ±6.67 degrees—a 33% increase coverage. This larger beam pattern would allow the LEO system to begin operation with only 27 spacecraft per orbit, instead of 36, as would be required for a ±5 degree beam pattern. This feature would enable earlier turn on of the system and generation of revenue. The advancement of revenue generation may be several months or more, depending on how rapidly the constellation is being populated.

Figure 3F:
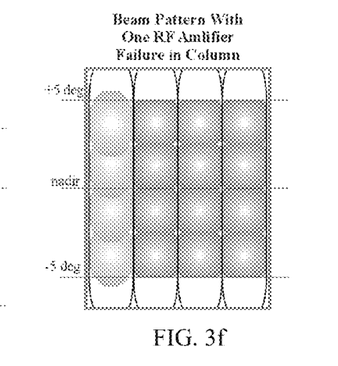

FIG. 3f shows the ability of the digital beamformer to continue to generate all four beams even if one of the RF amplifiers fails. The beams in the first column of FIG. 3f are broader and have less peak gain, but still provide full coverage, albeit with reduced throughput.

Figure 4A:
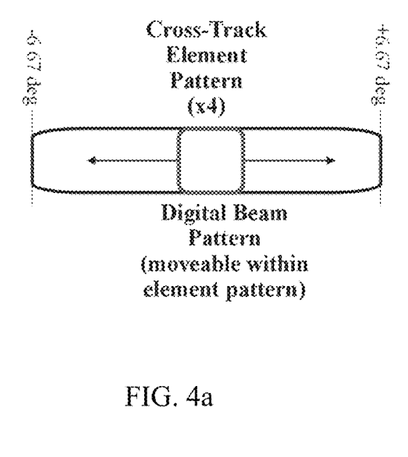
FIGS. 4a and 4b show a cross-track digital beamforming example.
Figure 4B:
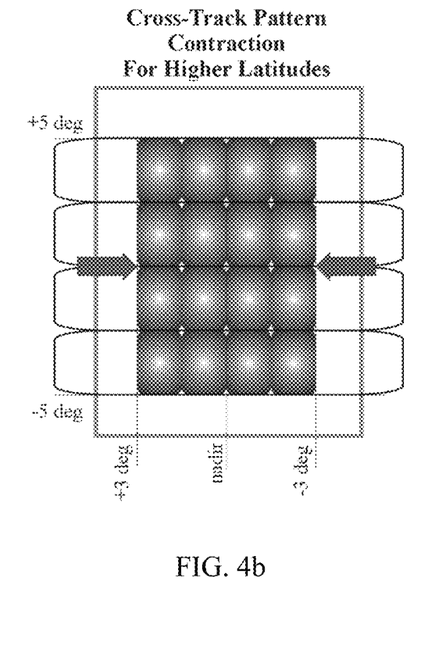

FIGS. 4a and 4b show the beam pattern oriented so the digital beamforming takes place in the cross-track direction. In FIG. 4a, the controlled movement of a single beam in the cross-track direction is shown. In FIG. 4b, the digital beamformer is used to compress the beam pattern. This provides more effective coverage in higher latitudes, where the orbital planes are closer together. Because many of the heavily subscribed areas are in higher latitudes, this can provide a significant increase in subscriber capacity and revenue. Although the potential for beam spreading is shown in the in-track direction (FIG. 3e) and the potential for beam compression is shown in the cross-track direction (FIG. 4b), either technique for spreading or compressing can be used in either the in-track direction, the cross-track direction, or any direction between those two directions.

Figure 5:
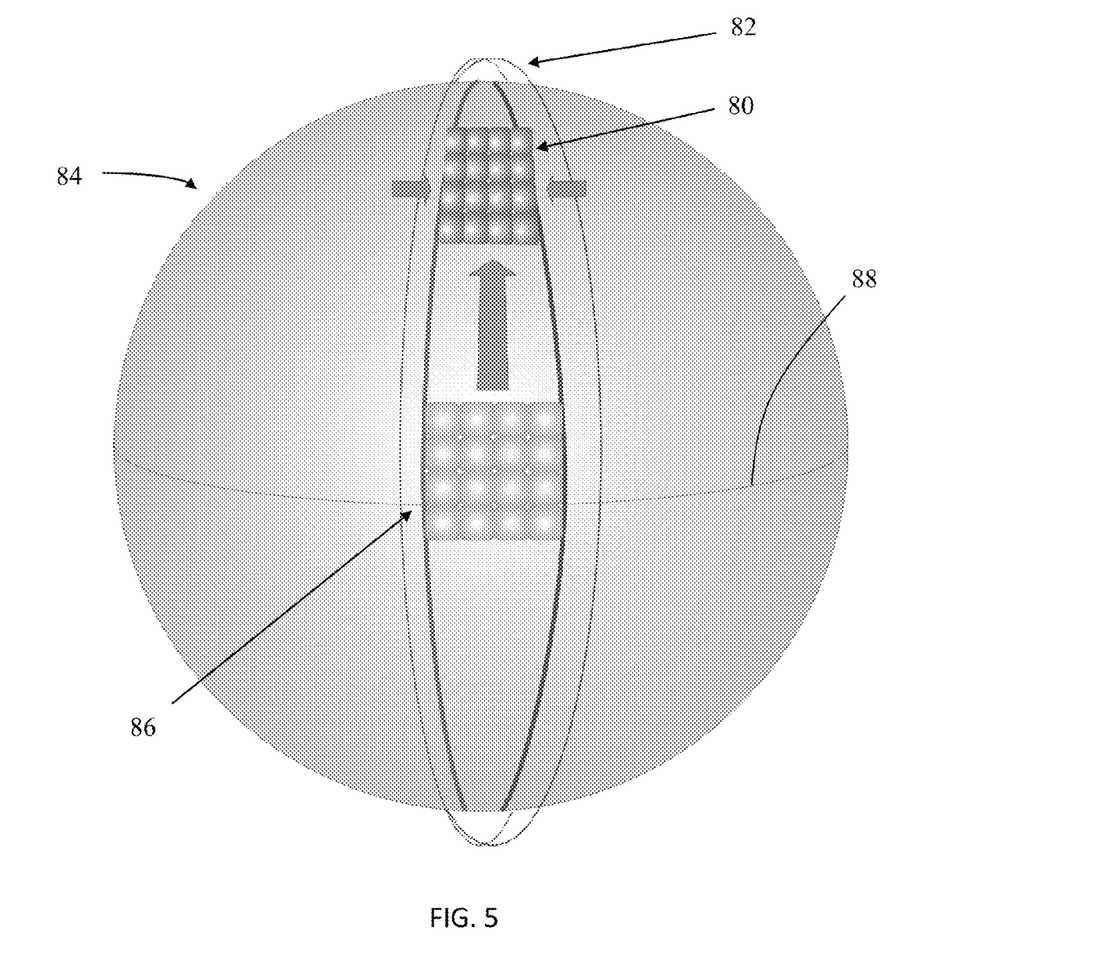
FIG. 5 shows an example of narrowing the beam pattern at higher latitudes.

FIG. 5 shows how the compression of the beam pattern in the cross-track direction can be used to shrink the width of the pattern 80 in higher latitudes (in this case, northern latitudes, near the north pole 82) as the satellite orbits the Earth 84. The pattern can then be returned to a less-shrunk pattern 86 near the equator 88. In this manner, the number of beams per unit area on the Earth is increased in the higher latitudes, which can be beneficial in heavily-populated areas.

While digital beamforming in the receive direction is not specifically shown, it can be understood to be performed in a generally complementary manner in which one or more digital beamformer units each include M different antenna elements that generate M different analog RF element signals which form M different overlapping element beams oriented along an axis in space, M amplifiers to amplify the M element signals, and M ADCs to digitize the analog signals. One or more digital beamformers receive the M different digitized element signals and perform digital beamforming on them to create M different digital beam signals. These beamforming units may create an M×N array of different beams (where N equals the number of beamforming units). While perhaps not required, certain RF and IF analog components and signal condition elements may be employed, such as RF mix elements, filters, impedance matching networks, other stages, and other RF analog components as needed.

Figure 6:
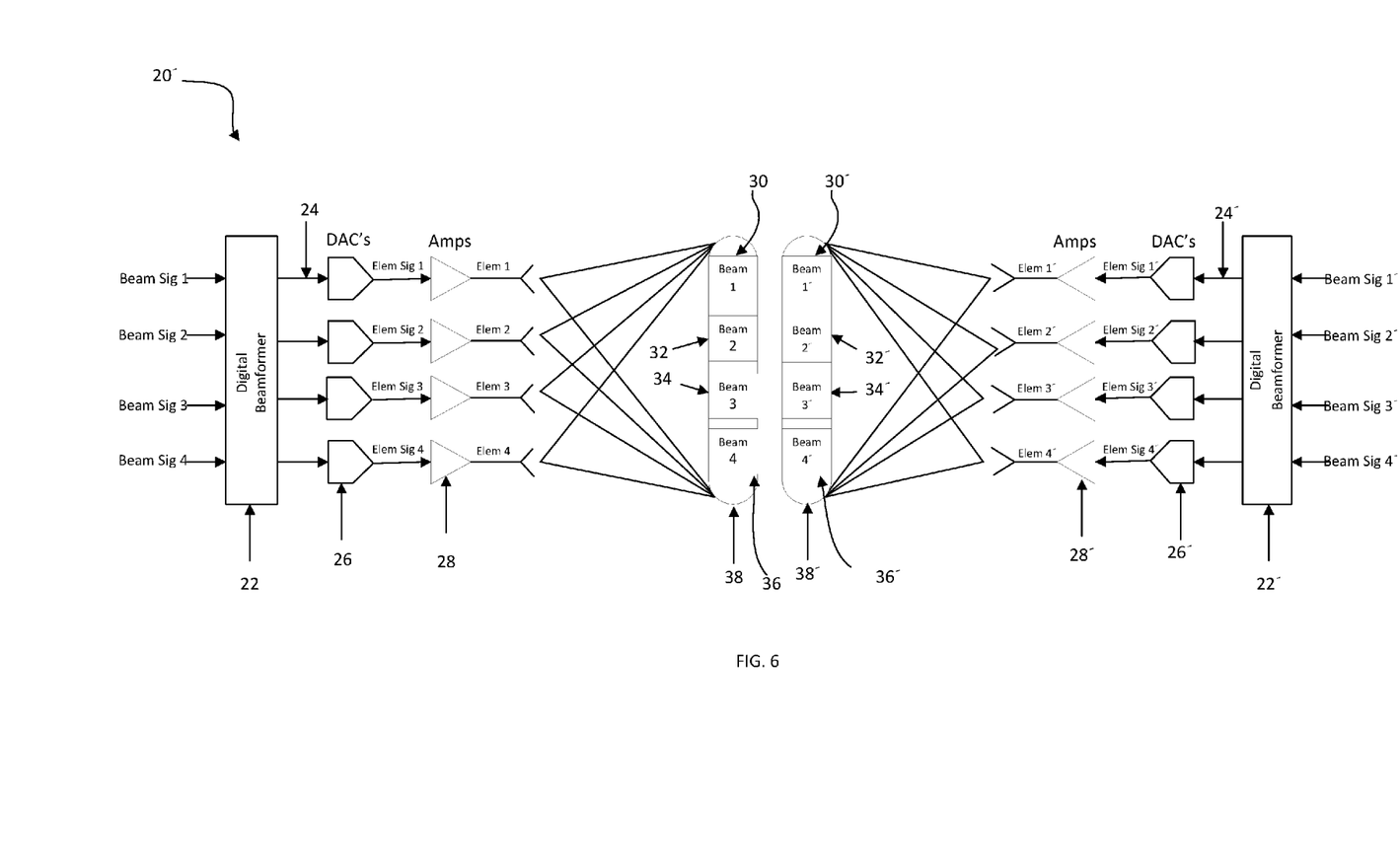
FIG. 6 shows a block diagram showing two beamforming units to form two columns of beams.

FIG. 6 shows a system 20' with a similar arrangement as 20 of FIG. 2, but with a second beamformer 22' and related componentry added. All of the original componentry of FIG. 2 is included in FIG. 6 and identical reference numbers refer to identical components. Prime indicators (') are used for similar components as exist in system 20. Beam signals 1', 2', 3', and 4' are received by digital beamformer 22' to create four different beamformed signals 24'. Four digital-to-analog converters 26' convert the four different beamformed signals 24' to four different beamformed analog signals that are respectively received by four amplifiers 28', which amplify the analog signals. Four different antenna elements 1', 2', 3', and 4', respectively, transmit the amplified beamformed analog signals to form four different beams 30', 32', 34', 36', oriented along an axis in space to form a column 38'.

The beam patterns discussed herein can be stretched or shrunk by changing the angular separation between the beams (relative to the spacecraft). This angular separation can be increased or decreased, as needed. This changes the overall angular extent of the beam pattern within the column in one direction, while in the orthogonal direction, the width of the column is controlled not by digital beamforming, but by the antenna elements and the overall transmission or reception operation. Thus the movement of the beams is within the column.

There are many alternatives to the specifics discussed herein. For one thing, any of the features shown in any of the discussion provided herein could be incorporated into or combined with any other feature or design discussed herein. As a further example, any of the functionality of any of the described components could be combined with other components or further separated. For example, while the specific examples discussed herein involve a 4×4 array of beams, these techniques are equally applicable to any M×N array of beams, where both M and N are non-zero positive integers, whose value is greater than 1.

The following are some of the novel aspects of the techniques disclosed herein:

1) It is novel to implement beamforming with a digital approach in one direction and a physical/analog approach in the other direction. Most satellite systems with beamforming are either fully digital or fully physical/analog (i.e. digital in both dimensions or physical/analog in both dimensions.)

2) It is novel to digitally beamform with only a few elements so that all the signals can be processed in a single digital device. This makes it much easier to keep the elements aligned, since a) only a subset of the elements must be aligned with each other, and b) the signals for that subset of elements are all generated or processed within a single device. Ideally, this enables the system to operate without the need for any RF calibration after launch.

3) It is novel to utilize this limited digital beamforming to provide graceful degradation in case of amplifier or other failure, such that the full complement of beams is still produced even if one of the RF pipelines fails.

4) It is novel to utilize fixed element patterns from a subset of elements, which overlap, and provide an area which is stretched in one dimension, within which the digital beams may be formed and moved. A more traditional approach is for the element patterns to encompass both dimensions, and for all of the element's patterns (not just a column of elements) to overlap, as in systems which implement digital beamforming in both directions.

5) It is novel to utilize the flexibility of the digital beams to expand/contract an otherwise static beam pattern to enhance performance in different phases of a LEO satellite mission. Existing LEO satellite systems have fixed beams (like Iridium, for example), which cannot be adjusted to better facilitate the different mission phases. For large LEO constellations, there is a significant amount of time between the beginning of the launch phase and the completion of the constellation. As these systems are expected to generate large monthly cash flows (>$100M/month), enabling the turn-on of the constellation early results in a significant increase in revenue. After the constellation is fully populated, any modifications to the beam pattern to increase revenue by increasing the subscriber density may also result in significant increases in revenue.

6) It is novel to rotate the spacecraft for different mission phases to utilize this one-dimensional flexibility, so that it provides widened coverage in the in-track direction early in the life of the system for earlier turn-on, and then narrowed coverage in the cross-track direction later in the life of the system.

7) It is novel to orient the spacecraft such that the digital beam patterns may expand in the in-track direction, to allow fewer spacecraft per orbital plane.

8) It is novel to expand (stretch, dilate) the beam pattern in the in-track direction during the early phases of populating a LEO constellation to achieve full coverage at an earlier date, when the constellation is not yet populated with its full complement of spacecraft.

9) It is novel to contract (squint, shrink) the beam pattern in the in-track direction back to a nominal size for normal operation after the constellation has achieved a nominal number of satellites.

10) It is novel to rotate the spacecraft so that the digital beam patterns may be contracted in the cross-track direction at higher latitudes, providing denser beam pattern over more populous areas, enabling the spacecraft to support more subscribers.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A transmit beamformer, comprising:
a first beamforming unit that receives M different digital signals to each be placed into M beams; and
a second beamforming unit that receives M different digital signals to each be placed into M beams;
wherein each of the first and second beamforming unit includes:

a digital beamformer that receives the M different digital signals to each be placed into a beam, and performs digital beamforming on the M different digital signals to create M different beamformed digital signals;

M digital-to-analog converters to convert the M different beamformed digital signals to M different beamformed analog signals;

M amplifiers to amplify the M different beamformed analog signals; and

M antenna elements to transmit the M different amplified beamformed analog signals to form M different beams oriented along a first axis in space;

wherein the first and second beamforming units that each form M different beams creates an M×2 array of different beams;

wherein each of the beams in the M×2 array of beams is created by digital beamforming; and wherein the width of the beams in the M×2 array of beams along a second axis orthogonal to the first axis is based on one or more physical characteristics of the antenna elements.

2. The transmit beamformer as defined in claim 1, wherein the physical characteristics of the antenna elements include an orientation of the antenna elements.

3. A receive beamformer, comprising:

a first beamforming unit that receives M different element signals to each be formed into M beams; and a second beamforming unit that receives M different element signals to each be formed into M beams;

wherein each of the first and second beamforming unit includes:

M antenna elements to receive the M different analog RF element signals to form M different overlapping element beams oriented along a first axis in space;

M amplifiers to amplify the M element signals;

M Analog to Digital Converters (ADCs) to digitize the amplified element signals; and a digital beamformer that receives the M different digitized element signals, and performs digital beamforming on the M different digital element signals to create M different digital beam signals;

wherein the first and second beamforming units that each form M different beams create an M×2 array of different beams;

wherein each of the beams in the M×2 array of beams is created by digital beamforming; and wherein the width of the beams in the M×2 array of beams along a second axis orthogonal to the first axis is based on one or more physical characteristics of the antenna elements.

4. The receive beamformer as defined in claim 3, wherein the physical characteristics of the antenna elements include an orientation of the antenna elements.

5. A method for forming transmitted beams, comprising:

performing the following operations N times on different sets of digital signals:

receiving, via a plurality of antenna elements, M different digital signals to each be placed into a beam;

performing digital beamforming on the M different digital signals to create M different beamformed digital signals;

converting the M different beamformed digital signals to M different beamformed analog signals;

amplifying the M different beamformed analog signals; and transmitting the M different amplified beamformed analog signals to form M different beams oriented along a first axis in space;

wherein an M×N array of different beams is formed thereby wherein the M×N array includes N columns of M beams, and wherein a position of each of the M beams in each column is created by digital beamforming, but each column has a width along a second axis orthogonal to the first axis that is determined by an orientation of the antenna elements and is not determined by digital beamforming.

6. A method as defined in claim 5, wherein each column of M beams has an angular extent.

7. A method as defined in claim 6, wherein the angular extent can be varied by digital beamforming.

8. A method as defined in claim 7, wherein the angular extent is reduced.

9. A method as defined in claim 7, wherein the angular extent is increased.

10. A method as defined in claim 5, wherein the method is practiced in a satellite orbiting around the Earth, wherein the direction of orbit of the satellite relative to the Earth is an in-track direction and an orthogonal direction is a cross-track direction;

wherein one or more of the M beams is moved relative to the satellite by digital beamforming to move the position of the one or more of the M beams on the Earth.

11. A method as defined in claim 10, wherein one or more of the M beams is moved in the in-track direction by digital beamforming.

12. A method as defined in claim 10, wherein one or more of the M beams is moved in the cross-track direction by digital beamforming.

13. A method for forming received beams, comprising:

performing the following operations N times on different sets of analog element signals:

receiving, via a plurality of antenna elements, M different analog element signals;

amplifying the M element signals;

digitizing the M element signals; and performing digital beamforming on the M different digital element signals to create M different digital beam signals that are oriented along a first axis in space;

wherein an M×N array of different beams is formed thereby, wherein the M×N array includes N columns of M beams, and wherein a position of each of the M beams in each column is created by digital beamforming, but each column has a width along a second axis orthogonal to the first axis that is determined by an orientation of the antenna elements and is not determined by digital beamforming.

14. A method as defined in claim 13, wherein each column of M beams has an angular extent.

15. A method as defined in claim 14, wherein the angular extent can be varied by digital beamforming.

16. A method as defined in claim 14, wherein the angular extent is reduced.

17. A method as defined in claim 14, wherein the angular extent is increased.

18. A method as defined in claim 13, wherein the method is practiced in a satellite orbiting around the Earth, wherein the direction of orbit of the satellite relative to the Earth is an in-track direction and an orthogonal direction is a cross-track direction;

wherein one or more of the M beams is moved relative to the satellite by digital beamforming to move the position of the one or more of the M beams on the Earth.

19. A method as defined in claim 18, wherein one or more of the M beams is moved in the in-track direction by digital beamforming.

20. A method as defined in claim 18, wherein one or more of the M beams is moved in the cross-track direction by digital beamforming.

* * * * *